United States Patent [19]

Fry et al.

[11] Patent Number: 4,679,840
[45] Date of Patent: Jul. 14, 1987

[54] SEAT FOR A TRUCK BED

[76] Inventors: Steven A. Fry, 30052 Running Deer La., Laguna Niguel, Calif. 92677; Rodney L. Stafford, 100 S. Seranada, #44, Orange, Calif. 92669

[21] Appl. No.: 910,329

[22] Filed: Sep. 22, 1986

Related U.S. Application Data

[63] Continuation of Ser. No. 829,453, Feb. 10, 1986, abandoned, which is a continuation of Ser. No. 622,136, Jun. 19, 1984, abandoned, which is a continuation-in-part of Ser. No. 567,269, Dec. 30, 1983, abandoned.

[51] Int. Cl.$^4$ .................... B60N 1/00; B60N 1/12; A47C 7/36
[52] U.S. Cl. .................... 296/64; 296/63; 5/118; 5/120; 297/441; 297/408; 297/DIG. 1
[58] Field of Search .................... 296/63, 64, 65 R, 69; 5/118, 119, 120, 122, 123, 127, 129, 130, 94, 98 B; 297/441, 457, 15, 403, 391, 396, 408, 455, 456, DIG. 1, 19, 351; 248/102, 201, 251, 503, 503.1; 403/108, DIG. 6; 521/904

[56] References Cited

U.S. PATENT DOCUMENTS

| | | | |
|---|---|---|---|
| 392,112 | 10/1888 | Farwell | 5/122 |
| 483,218 | 9/1892 | Hayden | 5/98 B |
| 584,657 | 6/1897 | Worley | 248/503.1 |
| 1,528,129 | 3/1925 | Phillips | 5/119 |
| 1,943,648 | 1/1934 | Wessman | 5/118 |
| 2,691,783 | 10/1954 | Macaulay | 5/118 |
| 2,705,119 | 3/1955 | Ingwer | 403/118 |
| 2,988,135 | 6/1961 | Caminiti | 296/64 |
| 4,258,951 | 3/1981 | Groom | 297/441 |
| 4,357,723 | 11/1982 | Zelkowitz | 297/456 |
| 4,480,497 | 11/1984 | Locher | 403/DIG. 6 |
| 4,482,186 | 11/1984 | Gomes | 297/403 |

FOREIGN PATENT DOCUMENTS

| | | | |
|---|---|---|---|
| 2337641 | 8/1977 | France | 5/118 |
| 891254 | 3/1962 | United Kingdom | 5/118 |

*Primary Examiner*—Randolph A. Reese
*Assistant Examiner*—Dennis H. Pedder
*Attorney, Agent, or Firm*—Donald D. Mon

[57] ABSTRACT

A removable seat for a truck bed. The seat has front and back lateral runners, the front runner being the higher. The runners are telescopic in construction. Four attachments, two for each runner, are attached to the truck bed, and the runners are held to the truck bed by them. A flexible seat member has a slack length and extends between the runners. It forms a cavity to receive an occupant. A pair of flexible inelastic side panels are attached to the seat member, and a pair of side bands of flexible inelastic material having a shorter length than the slack length are supported by and extend between the runners. Together, the panels with bands make a side restraint and arm rest. A cushion is pivotally attached to the sheet adjacent to the higher runner, so it can be pivoted to protect an occupant from striking that runner. The attachments are preferably sockets to receive laterally extending tongues that are carried by the runners. Deflection of the runners enables the tongues to be retained more reliably in the sockets.

15 Claims, 7 Drawing Figures

SEAT FOR A TRUCK BED

This is a continuation of applicant's co-pending patent application, Ser. No. 829,453, filed Feb. 10, 1986, abandoned, which in turn is a continuation of applicant's once-co-pending patent application, Ser. No. 622,136, Filed June 19, 1984 (not abandoned), which in turn is a continuation-in-part of applicant's once-co-pending patent application Ser. No. 567,269, filed Dec. 30, 1983 (now abandoned).

FIELD OF THE INVENTION

This invention relates to a removeable seat for a truck bed.

BACKGROUND OF THE INVENTION

Truck beds such as in pickup trucks are often occupied by riders who, because no seats are provided must sit in the truck bed, which is uncomfortable. However, because the beds of the trucks are intended primarily for load carrying purposes, it is not practical to provide them with permanent seats. Accordingly, it is an object of this invention to provide a seat for a truck bed which can readily be installed and removed, and which can comfortably be occupied by a rider when installed.

BRIEF DESCRIPTION OF THE INVENTION

A seat for a truck bed according to this invention is mountable to the truck bed. It includes a pair of runners, each of which is attached to the truck bed by attachment means. One is higher than the other. A seat panel is supported by and between the runners. It extends between them to receive the seated rider. The higher runner may be the forward or the rearward one.

According to a preferred but optional feature of the invention, the runners may be telescopically collapsible in order to be stored advantageously.

The above and other features of this invention will be fully understood from the following detailed description and the accompanying drawings, in which:

DETAILED DESCRIPTION OF THE INVENTION

Figure 1:
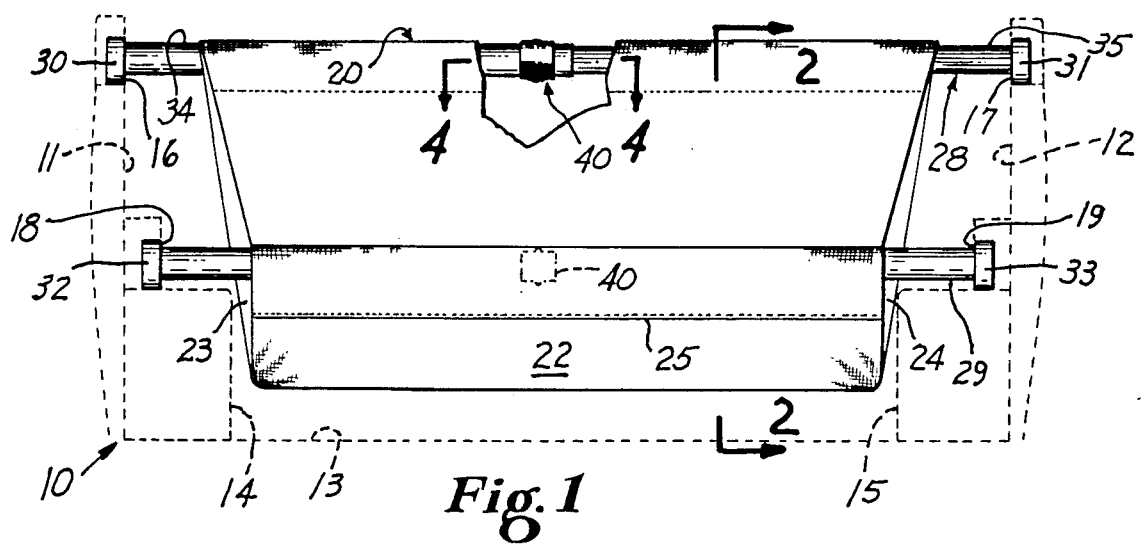
FIG. 1 is an elevation view of an installed seat according to the invention.
Figure 2:
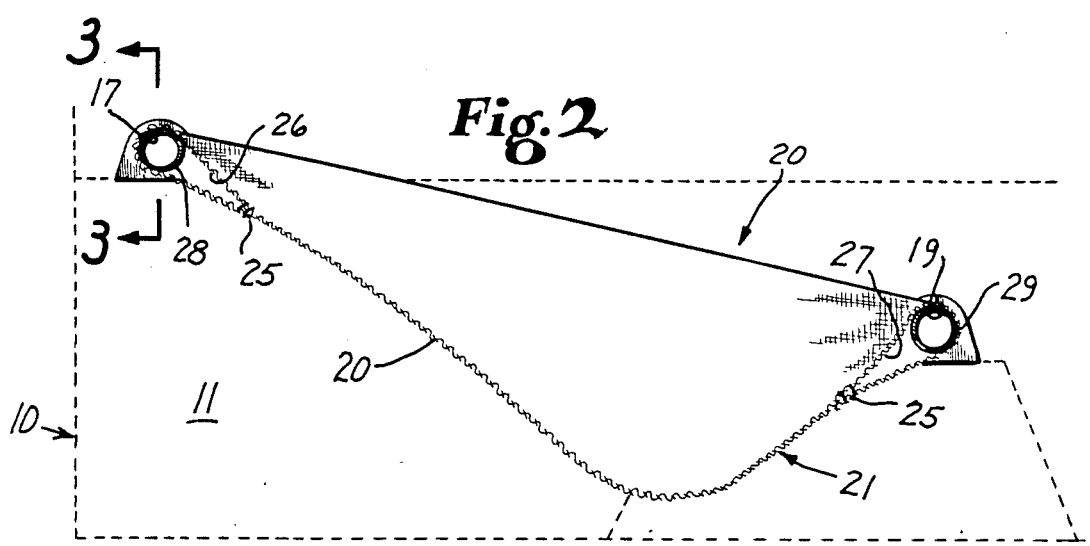
FIG. 2 is a left-hand side view of FIG. 1.
Figure 3:
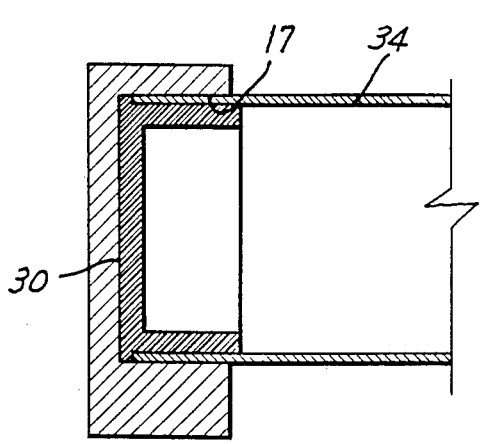
FIG. 3 and 4 are cross-sections taken at line 3—3 in FIG. 2 and line 4—4 in FIG. 1, respectively.
Figure 4:
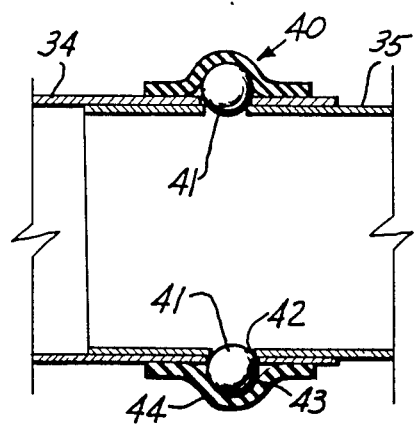

A truck bed 10 is schematically shown in FIGS. 1 and 2. It includes side rails 11, 12, a floor 13, and a pair of stanchions 14, 15 respectively. Socket members 16, 17, 18, 19 are respectively provided on elements 11, 12, 14, and 15. These socket members may be permanently installed, or may be removable, or may be holes in the sides as preferred. They are sometimes referred to as "attachment means".

A seat 20 comprises a seat member 21 which is preferably made of flexible material such as canvas or plastic sheeting which is inherently flexible and inelastic. It has a seat panel 22 and two side panels 23, 24 which are continuously attached to the edges of the seat panel. It can be shaped to give some side support to the rider. Seams 25 may be provided to form loops 26, 27 to receive respective runners 28, 29. The runners have at their extreme ends plugs 30, 31, 32, 33, which fit snugly into the socket members. Runners 28 and 29 are identical and parallel. Only runner 28 will be described in detail. It may, if desired, be a single continuous member, but this may be of an inconvenient length for storage. Therefore, for convenience, the runner may be made of a pair of segments 34, 35 one of which is telescopeable into the other. In order to hold the segments at their extended positions a lock 40 may be provided.

When the forward runner is the higher, the seat will face rearwardly, which is the usual arrangement. When the rearward runner is the higher, then the seat faces forwardly.

A convenient and inexpensive form of lock includes a plurality of balls 41 adapted to be pressed into detent holes 42, 43 in respective segments. A retainer 44 which may conveniently be a peripheral resilient sleeve biases the balls toward their inward position. A strong enough push or pull on the segments will cam the balls out of the holes against resilient resistance of the retainers so that the segments can be telescoped relative to one another. Absent such a force, the balls will hold the segments as shown.

It will now be seen that a convenient seat is provided. If the runners are not able to be telescoped, their plugs may simply be dropped into a socket or placed in them in accordance with any convenient technique. If they are telescoped they are simply pulled out to their desired extent during the course of which they may be inserted into holes into the side of the rails or may be inserted in sockets.

Figure 5:
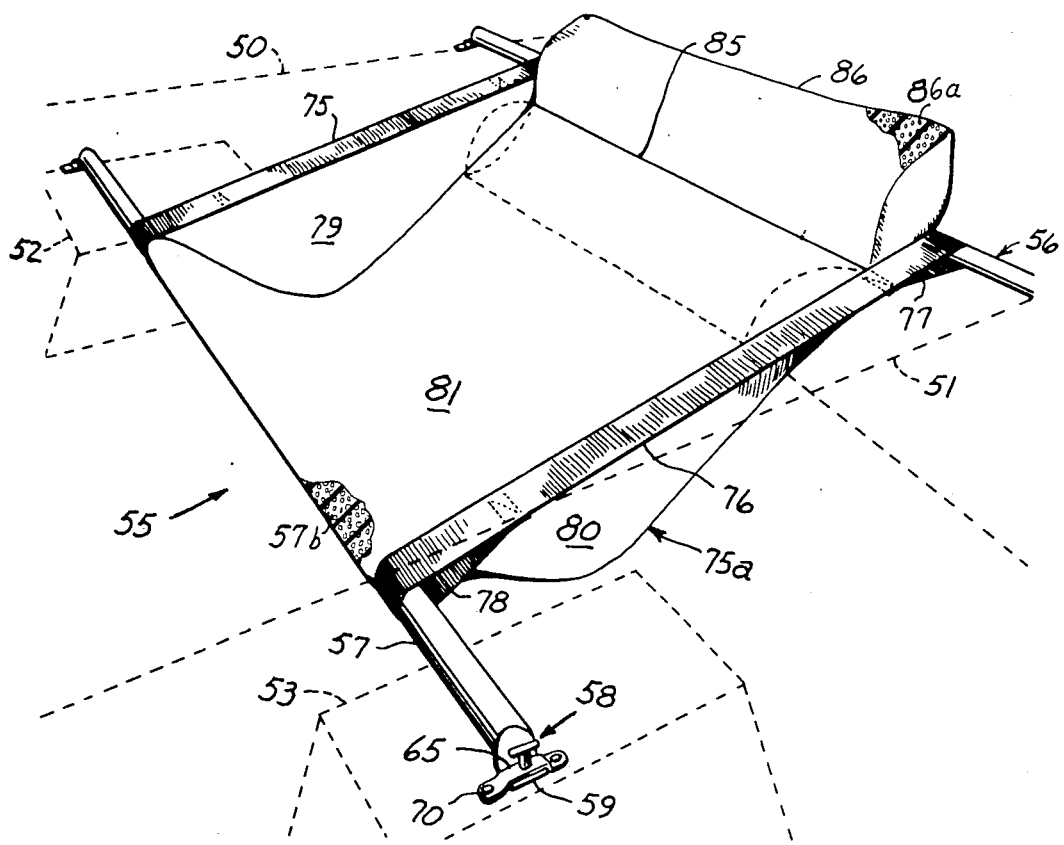
FIG. 5 is a perspective view of the presently-preferred embodiment of the invention.

FIG. 5 shows the presently-preferred embodiment of the invention. Side rails 50, 51 and stanchions 52, 53 exist as part of the truck bed.

The seat 55 includes runners 56, 57 which extend between the side rails and the stanchions, respectively. An attachment means 58 is typical of an attachment means provided on each of the side rails and on each of the stanchions, so only it will be shown and described in detail. Both runners have at both ends a tongue 59, which it is the function of the attachment means to receive and to hold.

Figures 6, 7:
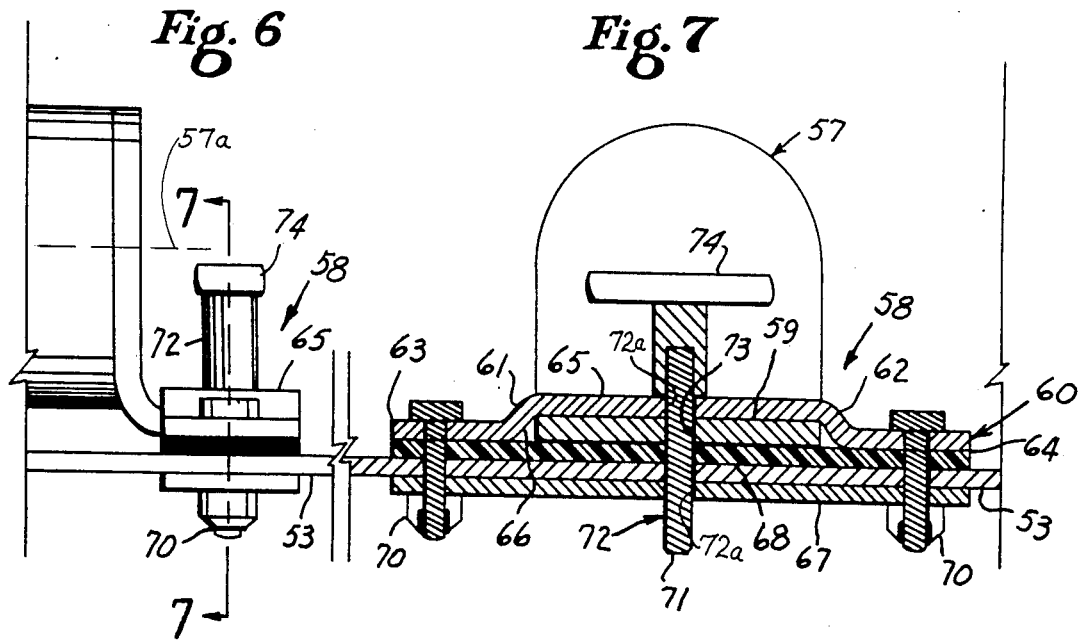
FIG. 6 is a side-view of a detail in FIG. 5.
FIG. 7 is a cross-section taken at line 7—7 in FIG. 6.

As best shown in FIG. 7, the attachment means has a strap 60 with a pair of joggles 61, 62 which form flanges 63, 64 and a central offset plate 65 that leaves a passage 66 between the joggles. Passage 66 is sometimes called a "socket".

A doubler plate 67 is placed beneath stanchions 53, and a gasket 68 is placed between the strap and the top of the stanchion. Then this assembly is bolted to the stanchion by fastener 70, which may be rivets, or nut/-bolt combinations, for example.

The shank 71 of a lock pin 72 (sometimes called a "cross-pin") can be inserted into aligned holes 72a (sometimes called "cross-parts") in the strap, gasket, stanchion and doubler, and through a hole 73 in a tongue on the end of runner 57. The tongue is flattened so as to make a close fit in passage 66. A head 74 on the lock pin enables it to be lifted. If desired, part of the shank could be threaded so as to engage with a matching thread (not shown or required) in one of the holes, or with a nut (also not shown or required) to hold it firmly in place, if desired.

The runners may be made of two telescopic tubings which overlap each other when installed. This enables the tongues at both ends of the runners to be inserted into the attachment means and be held there. This is a strong attachment which holds the runner firmly and reliably in its installed position, but still permits easy installation and removal. With this arrangement, the lockpins act as a lock, and other locking means are unnecessary. With reference to FIG. 6, notice that tongue 59 is laterally offset from the central axis 57a of runner 57, and in this sense it is an "offset tongue". In the illustration, it is below it. It is parallel to central axis 57a.

Seat 55 includes a seat member 75a which has a pair of side bands 75, 76, each with a forward loop 77 and a rearward loop 78 wrapped around a respective runner. These side bands are made of a flexible material which is not substantially elastic, such as cord-reinforced canvas fabric. It is intended to form an armrest, and upper edge support for side panels 79, 80, which are attached to respective side bands. Their length is shorter than the running length of the edge of the central seat member. They are in a location at each side of the seat member such that an arm of the passenger can rest on them. They form a side restraint. When a weight such as passenger's arm bears on the side band, it becomes taut in the sense of being tightened against the runner. As shown in the drawings, each side band is continuously attached to a respective side panel. Seat panel 81 is attached to the lower edges of respective side panels 79, 80. The lower edge of the side panels is shaped so as to form the edges of the seat panel into a comfortable concave shape to receive an occupant.

The forward and rearward edges of the seat panel are formed as loops around the runners for forward and rearward edge support.

The edge 85 of a cushion 86 is sewed or otherwise attached to the seat panel at a location spaced rearwardly from the front runner. Then it can be pivoted around its edge to the position shown in solid line in FIG. 5, where it will be disposed between the passenger and the higher runner. For convenience in storage, it can be moved to the dashed line position. A separate "Velcro" strip (not shown) can be attached, one part to the cushion, and the other part to the seat panel, ahead of edge 85 so as to engage and hold the cushion in the solid line position. It can be moved to the dashed line position merely by separating the "Velcro" parts and turning the cushion down. "Velcro" is a registered trademark for a brand of hook and loop fabric.

The embodiment of FIGS. 5-7 provides a comfortable, shaped rear seat with side bands which act as shapers and as arm rests. The cushion can readily be stowed, or placed in its useful position.

In both embodiments the attachment means is simple and reliable. The embodiment of FIGS. 5-7 has the advantage that it can more readily be applied to an existing truck bed. Still, the seat panel of either embodiment can be used with either type of attachment means, or with other types which can readily be devised.

If desired, the cushion can be filled with rate sensitive foam material, and the runners can be covered with it, to give some protection against striking the runners. Such foam materials deflect more readily at lesser rates of load application, than at greater rates, thereby to give added protection against sharp blows against the runners.

In FIG. 5, a portion of the cover of cushion 86 has been removed to show the foam 86a inside it. Also in FIG. 5, a portion of seat 81 has been removed to show a layer of foam 57b around runner 57. The characterizing feature of rate-responsive foams is that they are open-cell, so that air (or other gas) is transferred from cell to cell when the foam is compressed, as well as the gas being compressed. Because the cells are interconnected by small passages, they tend to limit the rate of flow between cells. A sharp blow, for example, is more resisted than a gradually applied force, because the gas does not have as much time to flow between cells. Thus, there is a "stiffer" response to a sharp blow than to a more gradually applied force. A rate-sensitive foam is therefore less "springlike than a closed cell foam.

It will be noted that the "socket" in FIG. 1 receives the runner either from above, or from the side, and the means to maintain integrity is the lock, or the use of a single-piece runner. In FIG. 5, the tongue is received from the side, and integrity is provided by the lock pin when a two-piece runner is used.

This invention thereby provides a convenient and inexpensive rear seat for a truck bed which can conveniently be installed and removed, and which can if desired, be reduced in size for convenient storage.

This invention is not to be limited by the embodiments shown in the drawings and described in the description, which are given by way of example and not of limitation, but only in accordance with the scope of the appended claims.

We claim:

1. A seat for a truck bed, which truck bed has an axis of forward movement, and a lateral dimension of a substantial width, said seat comprising:
   a forwardly located, and a rearwardly located runner, each extending laterally across the truck bed, and each having a pair of ends, each said runner comprising a pair of telescopically engaged and overlapping tubular sections which enable the length of said runners to be lengthened or shortened;
   four attachment means, each adapted to attach a respective end of a runner to said truck bed, the two attachment means respective to one of said runners being adapted to be attached to said truck bed higher than the two attachment means respective to the other said runner, whereby one runner is higher than the other, the runners being parallel to one another; and
   a seat member supported by and extending between both of said runners, said seat member comprising a flexible inelastic central sheet of substantial width to accomodate an occupant, having a slack length greater than a straight-line distance between the runners in order to form a concave cavity to receive and seat the occupant, a pair of flexible, inelastic side panels conforming in edge shape to a slack contour of said cavity, each attached continuously to a respective edge of the central sheet and extending generally upwardly and, a pair of side bands of flexible inelastic material having a substantial width and being supported by and extending between said runners, and having a length shorter than the slack length of said edges of the central sheet, whereby to form side restraints and arm rests, and to make the side panels taut; the upper edges of the side panels being continuously attached to a respective side band so each side panel forms a respective closure of the seat cavity at the edge; whereby to provide lateral stability and support for an occupant.

2. A seat according to claim 1 in which said cushion can be pivoted to a position spaced from said runner, whereby to be more conveniently and compactly stored.

3. A seat according to claim 2 in which said cushion is made of compressible material.

4. A seat according to claim 3 in which said compressible material in a rate-responsive foam.

5. A seat according to claim 1 in which each said attachment means comprises a bracket attachable to said truck bed, forming a laterally extending socket with a cross-port, and in which each end of said runners has a tongue insertable by movement in a lateral direction into said socket to be retained by a removable cross-pin, said tongue having an aperture alignable with said cross-port to receive said cross-pin to hold the end of the respective runner to the bracket; said runners being contractable in length by telescopic movement to enable the entry of the tongues into the sockets.

6. A seat according to claim 5 in which said bracket includes a gasket supporting and cushioning said tongue, and spreading the force of its load to the truck bed.

7. A seat according to claim 5 in which said socket includes a doubler plate placed on the side of the truck bed away from the socket, to reinforce the material of the truck bed.

8. A seat according to claim 1 in which the lower of said runners carries a layer of cushioning foam.

9. In combination: a truck bed having an axis of forward movement, and a lateral dimension of substantial width and a seat of substantial width attached to said truck bed, said seat comprising:

a forwardly located, and rearwardly located runner, each extending laterally across the truck bed, and each having a pair of ends; each said runner comprising a pair of telescopically engaged and overlapping tubular sections which enable the length of said runners to be lengthened or shortened:

four attachment means on said truck bed, each adapted to attach a respective end of a runner to said truck bed, the two attachment means respective to one of said runners being higher than the two attachment means respective to the other said runner, whereby one runner will be higher that the other, the runners being parallel to one another; and a seat member supported by and extending between both of said runners, said seat member comprising a flexible inelastic central sheet of substantial width to accomodate an occupant, having a slack length greater than a straight-line distance between the runners in order to form a concave cavity to receive and seat the occupant, a pair of flexible, inelastic side panels conforming in edge shape to a slack contour of said cavity, each attached continuously to a respective edge of the central sheet and extending generally upwardly, and a pair of side bands of flexible inelastic material having a substantial width and being supported by and extending between said runners, and having a length shorter than the slack length of said edges of the central sheet; whereby to form side restraints and arm rests, and to make the side panels taut; the upper edges of the side panels being continuously attached to a respective side band so each side panel forms a respective closure of the seat cavity at the edge whereby to provide lateral stability and support for an occupant.

10. A combination according to claim 9 in which each said attachment means comprises a bracket attached to said truck bed forming a laterally-extending socket with a cross-port, and in which each of said runners has a tongue inserted into a respective said socket and retained by a removable cross-pin passed through said cross-port and through an aperture in said tongue.

11. A combination according to claim 10 in which each of said runners has a central axis, and in which each said tongue is parallel to and laterally offset from said central axis.

12. A seat according to claim 5 in which each of said runners has a central axis, and in which each said tongue is parallel to and laterally offset from said central axis.

13. A seat according to claim 1 in which a cushion is pivotally attached to the central sheet adjacent to the higher one of said runners, the point of attachment of the cushion to the central sheet being spaced from the higher runner so that the cushion can be pivoted to one position where it fits between said runner and an occupant seated in the seat, thereby to protect the occupant from striking the runner directly through the central sheet.

14. A combination according to claim 9 in which a cushion is pivotally attached to the central sheet adjacent to the higher one of said runners, the point of attachment of the cushion to the central sheet being spaced from the higher runner so that the cushion can be pivoted to one position where it fits between said runner and an occupant seated in the seat, thereby to protect the occupant from striking the runner directly through the central sheet.

15. A seat according to claim 14 in which said cushion can be pivoted to a position spaced from said runner, whereby to be more conveniently and compactly stored.

* * * * *